Patented Apr. 27, 1943

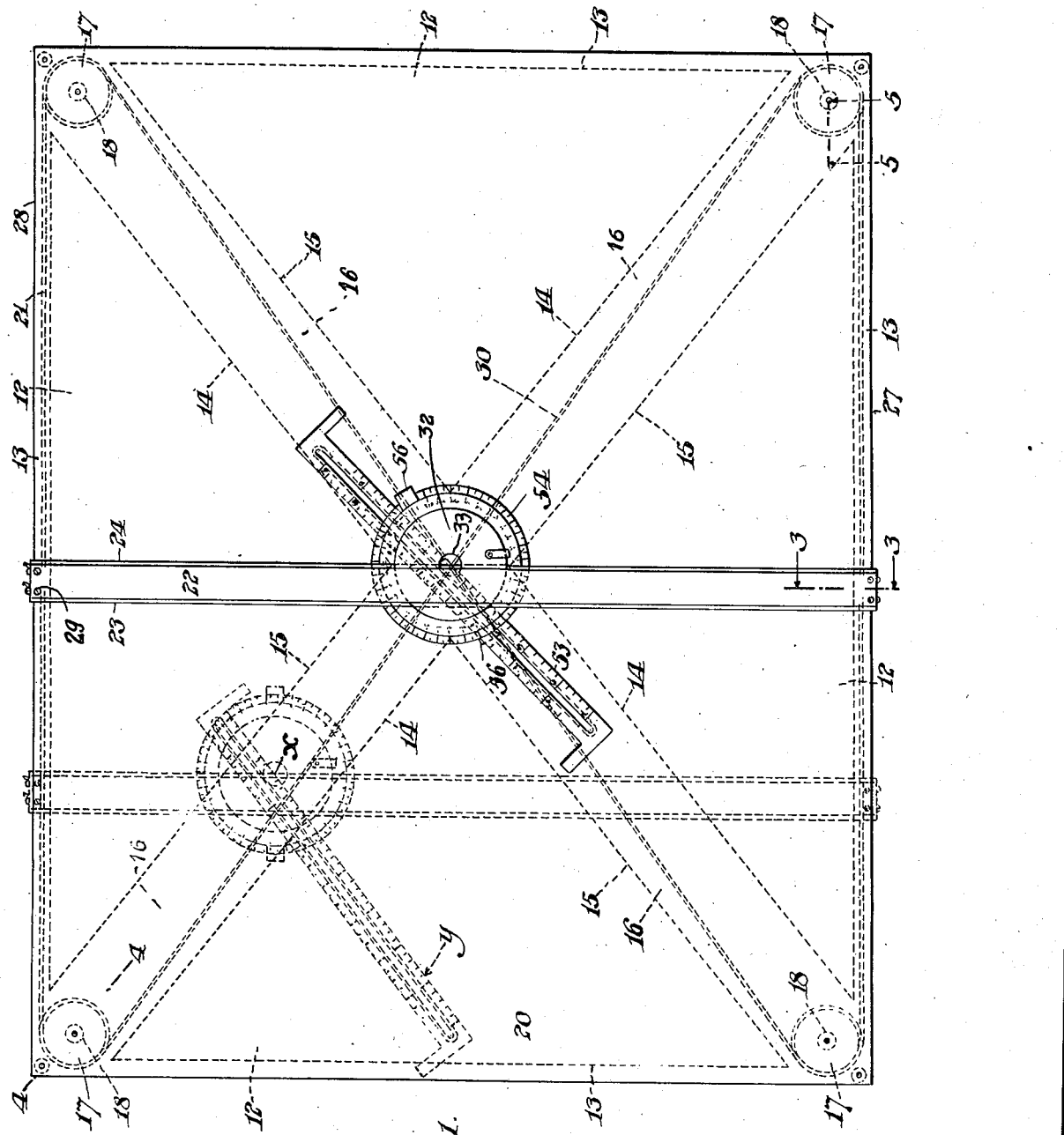

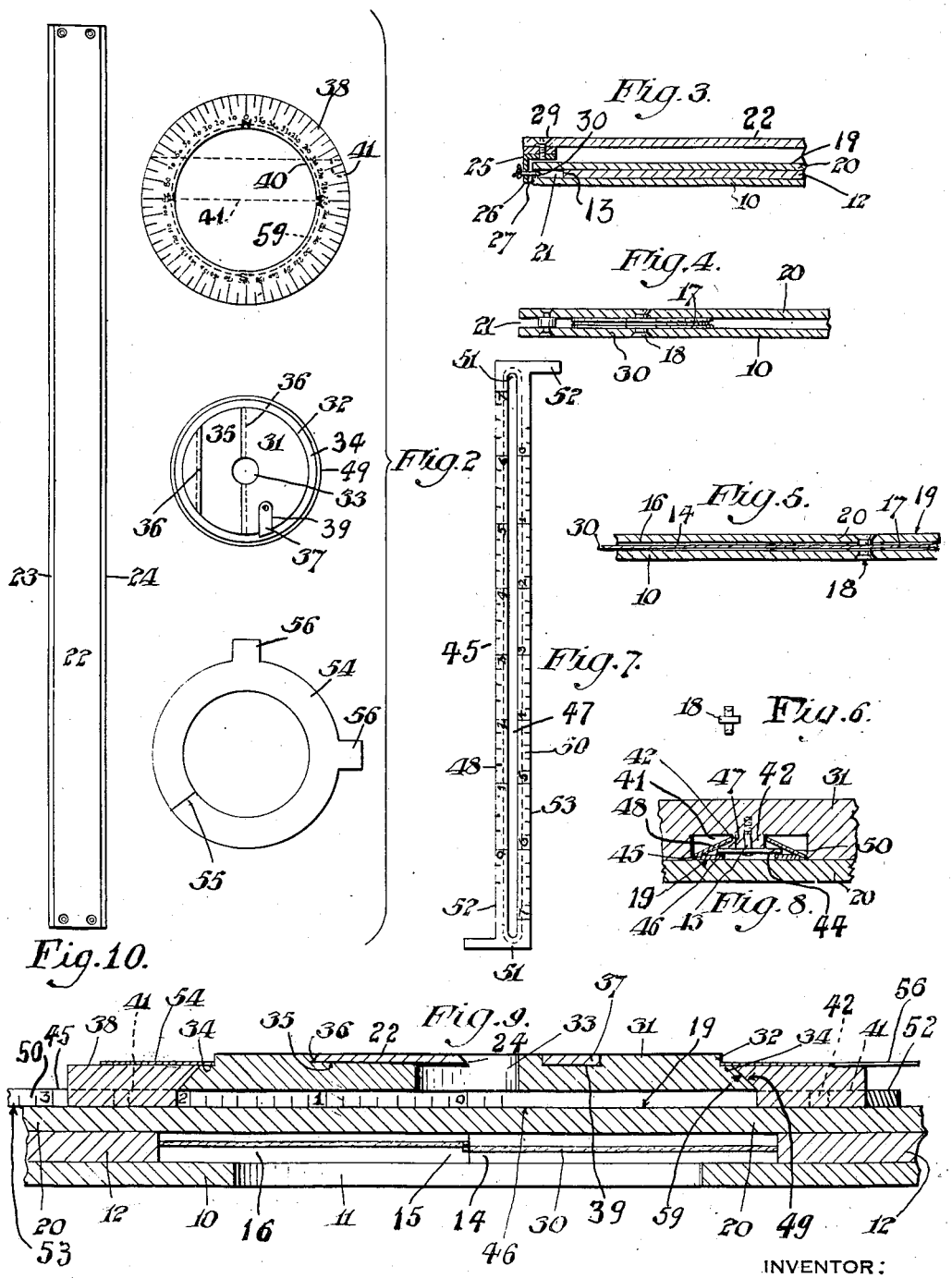

2,317,856

UNITED STATES PATENT OFFICE 2,317,856

PLOTTING BOARD

Oliver John Mock, Philadelphia, Pa., assignor to Theo. Alteneder & Sons, Philadelphia, Pa., a corporation of Pennsylvania Application September 26, 1941, Serial No. 412,403

9 Claims. (Cl. 33—80)

This invention relates to plotting boards.

It is among the objects of this invention; to provide a plotting device of simplicity and certainty of operation; to provide a plotting device for determining the compass course from one position to another on a given chart which course may have a full 360° of angular reference to a meridian of longitude according to the locations of the two points upon the chart; to provide a plotting instrument susceptible to one-handed operation; to provide a plotting instrument of universal adjustment through 360°, of a minimum thickness; to provide a plotting board formed of sheets of plastic and mounting sheaves and cables in protected relation so as to maintain the predetermined angular positioning of a movable straight edge; to provide a plotting board of lightness and strength so as to be of enhanced value for aircraft; and many other advantages will become more apparent as the description proceeds.

In carrying out the invention in a preferred form, a plotting board is provided with reference to which a vertical straight edge has freedom for bodily lateral motion parallel to the side edges of the board always normal to the vertically spaced edges, and which carries a disc having a hub slotted and undercut in its upper surface to receive the straight edge so as to permit the relative motion of the disc and straight edge. The hub of the disc has a concentric axial opening the axis of which lies in the line of an undercut of the slot. Upon the periphery of the disc there is mounted a protractor, graduated through 360°, and arranged for free rotation relative to the disc. The protractor is undercut or slotted on its lower surface to slideably receive a graduated straight edge, with an edge of its slot aligned with its axis, and the angular relation of which to the protractor is fixed and which is extensible laterally of the straight edge in both directions. The graduated straight edge and the vertical straight edge are each eccentrically positioned in their respective mounting elements so that their mutual intersection is at a point concentric with the axis of the axial aperture in the disc, in all relative positions of adjustment, and this point is arranged for positioning over the starting point on the given chart from which to plot the course to the objective. A secondary planar disc carrying a lubber line is superimposed upon the protractor and has suitable laterally extending handles lying in its plane so as to render it capable of adjustment relative to the disc, under the restraint of a friction device carried by the disc, so that compensation for declination or deviation can be made so that a corrected compass course will be indicated. The protractor carried straight edge is graduated on one side at least in units preferably representing the same units as the appropriate coordinated chart so that the number of graduations from the central point to the objective on the chart will indicate the distance to be traversed. The vertical straight edge and the disc are each preferably formed of a transparent plastic so as to facilitate the determination of the starting point on the chart and the reading thereof.

In the accompanying drawings forming a part of this description:

Fig. 1 represents a plan of the assembled plotting board of this invention in full lines, and showing in dotted lines an adjusted course-plotting position of the parts.

Fig. 2 represents an exploded view of the three concentric elements comprising the central nucleus of the instrument.

Fig. 3 represents a fragmentary section on the line 3—3 of Fig. 1.

Fig. 4 represents a section on line 4—4 of Fig. 1.

Fig. 5 represents a fragmentary section through the plotting board on line 5—5 of Fig. 1.

Fig. 6 represents an elevation of the spacing and anchoring flanged element for the pulleys between plastic sheets.

Fig. 7 represents a plan of the graduated straight edge.

Fig. 8 represents a fragmentary section through the straight edge and the supporting portions of the central hub.

Fig. 9 represents a fragmentary vertical section through the assembly taken approximately on line 9—9 of Fig. 1.

Fig. 10 represents a plan of the vertical straight edge showing the apertures to receive the screws.

The foundation of the plotting board of this invention is a lower plate 10 formed of a suitable plastic such as Vynolite, Lucite, or the like or which may be formed of metal or of wood or the like. Plate 10 is provided with a central axial hole or aperture 11 within the boundaries of which cables, to be described, may cross in contact without the constriction and frictional resistance and wear that otherwise would be secured if the aperture were not provided. Upon the lower plate 10 there is superimposed and cemented or otherwise secured, four triangular plastic elements 12, each of which has a base edge 13 and side edges 14 and 15. The contiguous or adjacent side edges 14 and 15 of adjacent triangular sheets 12 define with the lower plate three surfaces of the cord channels 16 which meet in a common area at the aperture 11. At the intersection of the cord channels 16 with the corners of the compound plastic sheet, sheaves or pulleys 17 are mounted upon the centrally flanged eyelet 18 (shown in Fig. 6 in elevation), which enlarged central flange forms a bearing for the pulley 17. The reduced ends extending normally of the flange are disposed in suitable apertures in the lower plastic sheet 10 and upset therein to anchor the eyelet to the sheet. The compound board is completed by the addition of the upper sheet 20 which overlies the pulleys and triangular plates and is anchored in place by the upper extensions of the eyelets 18 which are upset or swedged into the upper plastic sheet. It will be observed that the base edges 13 of the intermediate spacing sheets 13, at least at the top and the bottom of the board, are spaced sufficiently far from the free edges of the plates 10 and 20 as to form horizontal cord or cable receiving edge recesses 21. The plate 20 has an upper planar surface 19 to receive a map or chart, and with reference to which the movable elements slide.

A vertical straight edge member 22, preferably of transparent material, has the edge surfaces formed by the beveled or chamfered surfaces respectively 23 and 24. In order to secure the straight edge in generally parallel, slightly spaced relation to the compound board, one end thereof is secured to the L-shaped angle-piece 25 as by screws 29, either directly or with a spacing block between them. The angle-piece has the depending leg 26 arranged to slide over the lower compound or composite edge 27, formed by the edges of the lower and upper sheets 10 and 20, to restrict movement parallel with the board normally of the lower edge in one direction and to guide the lower end of the straight edge member. A similar L-shaped angle piece 25 including the depending leg 26 is mounted at the other end of the straight edge by screws 29, arranged to bear against the upper composite edge 28, to restrict motion of the straight edge parallel to the board but normal to the lower edge and to guide the upper end of the straight edge in the other direction. A cable 30, anchored to the leg 26 of the lower angle piece 25, at one side thereof, lies in the lower longitudinal recess 21 and extends laterally and about the sheave or pulley at the lower right hand corner, then diagonally across the board across the lower plate hole 11 and about the pulley at the upper left hand corner, passing through the aligned cord receiving channels 16, then extends laterally in upper channel 21 to engagement with the depending leg 26 of the upper end of the straight edge 22. The cable 30 may simply be anchored to the upper end of the straight edge and have an extension lying in the upper edge recess 21, then pressing about the pulley at the upper right hand corner, then diagonally through the aligned grooves 16 across opening 11, and about the pulley at the lower left hand corner, then laterally through the channel 21 to the other side of the first mentioned leg 26 at the lower end of the straight edge. This arrangement not only insures that all motion of the straight edge will be parallel to the lower edge and accompanied by maintenance of the initial normal angularity of the straight edge relative to the upper and lower board edges, but that also the straight edge will be anchored movably to the board. This also anchors the plotting mechanism to the straight edge by securing the ends of the straight edges to limit endwise motion of the plotting mechanism.

A preferably transparent plastic disc 31 is provided, having a central hub-like portion 32, pierced by a concentric axial aperture 33 extending completely through the disc, and has a short outer flange 34 and a tapered outer edge 49. The hub is milled out or molded in a transverse slot 35, undercut as indicated in dotted lines at 36, and extending substantially parallel to a tangent so that the edge of the inner undercut 36 passes through the center of the aperture 33. It will be understood that the rest of the hub assembly, to be described, will be preassembled and that as the last item the straight edge 22 will be slid endwise into the milled slot 35 to anchor the assembly together. Preferably a friction element 37 will be mounted in a recess 39 on the hub of the disc, to overlie the flange portion 34 in engagement therewith so as to exert frictional restraint upon an indicating disc 54 to restrain relative movement of the hub and the indicating disc.

A graduated protractor disc 38 is provided, the central concentric aperture 40 of which is defined by a sloping shoulder 59 and is arranged to slide over the central hub 32 of the central disc and to bear and be journaled upon the tapered outer edge 49 of the central disc 31. It is preferable that the protractor element 38 have a north indication as "N" at the zero point as indicated. The graduations progress counterclockwise so that at 90° east (E) is to the left facing north, south (S) is at 180° and west (W) will be at 270° on the protractor. The protractor 38 is transversely milled or molded by a slot 41 in its lower surface below the shoulder 59, also parallel to a tangent so that the inner edge of the slot passes through the center of the disc. The slot 41 need not be undercut but is preferably provided centrally with an integral, or separate, stud 42 arranged to receive a metallic or other rigid element such as a screw 43 having the flanged head or edge 44 for the purpose of securing the graduated straight edge to be described, in position in the slot 41.

A preferably metallic straight edge element 45 is provided having the generally flat lower surface 46 and having the central elongated longitudinal undercut or longitudinally recessed slot 47, through which the stud 42 is arranged to project either in whole or in part. The straight edge has a pair of sloping oppositely preferably graduated surfaces respectively 48 and 50 on each side of the central slot. The ends of the slot are closed by the transverse abutment member 51 at each end, and each is laterally prolonged in at least one direction as at 52 to furnish a handle-like projection for manipulating the course indicator. Preferably the slotted rigid straight-edge member, which is slidable in the slot in the protractor element, has one face graduated on one scale as illustratively sixty miles to two inches, while the other graduation may be on a different scale such as sixty miles to one and one-half inches. The edge 53 of the scale adjacent to the opening will preferably be calibrated in accordance with the chart most frequently used with the plotting board.

A transparent arcuate disc-like correction member 54 carrying a single radial or "lubber line" mark 55, is mounted for rotation upon the flange 34 of the hub member and the inner part of the upper surface of the protractor member 38, under the restraint of the friction member 37 bearing thereagainst. This compass course correction disc embraces the hub 32 and is provided with handles 56 by which it can be turned against the resistance of friction member 37, so as to move the lubberline 55 a few degrees to one side or the other of the guiding edge 24 of the straight edge 23 to which, angularly only, the central hub 31 is anchored.

The foregoing components will be nested and mounted in closely grouped relation and will all be anchored and secured through each other and to the vertical straight edge and thus to the composite board. It will be understood that each element, except the correction disc 54, will be arranged for relatively free movement, so that the entire actuation of the plotting board can be a one-handed function, leaving the other free for navigating the airplane or the like in which the device is used.

The operation of the device should be clear from the preceding description, but it may be mentioned that the first step is to attach, as by Scotch tape, or the like the chart or map of the particular territory to the surface 19 of the composite board. With the ascertainment of the location of the instantaneous position of the craft with reference to the chart, this location which will be physically located on the chart, by identification of an existing point, or the actual marking of such point thereon, will be identified as starting point X. It being desired to determine the course from the instantaneous position or start at X to the objective point Y, the deviation of lubberline 55 of disc 54 from coincidence with the guiding edge 24 of straight edge 22, will be set at the requisite number of degrees or minutes as to compensate for any errors incident to the particular position and time of the observation as for declination or for deviation of the compass. The graduated straight edge is manipulated and with it the protractor, and at the same time the vertical straight edge is moved bodily in such manner that the intersection of the guiding edge 24 of the straight edge 22, and the zero point of the primary straight edge 53 of the rigid graduated member 45 coincide in the center of the guide aperture 33 of the hub with the instantaneous position point X. While holding the vertical straight edge against shifting, the graduated straight edge has been previously elongated relative to the protractor in which it is slidable, until the zero point on the graduated straight edge is over the instantaneous position or starting point X, while the primary edge 53 of the graduated member 45 lies over the destination or objective point Y. In the absence of corrections for variation or deviation, or the like, the extension of the straight edge 53 from point X, to point Y, will give the compass course to the objective from the instantaneous position, by the relation of the protractor scale to the vertical edge 24. If a correction has been introduced, then the reading will be with reference to the lubberline 55. By counting the graduations from the zero point over the instantaneous position X to the objective point Y, the distance therefrom will be approximately determined.

The fact that the straight edge carrying the calibration can project from the line of straight edge 24, in any angular relation whatsoever thereto, through a full range of 360°, without replacements or exaggerated adjustment or complicated reversing of parts, or without difficult calculations renders the device of high utility, as this facilitates the one-handed operation thereof. The construction of the plastic materials and the extreme thinness of the entire assembly makes the device light and most adaptable for use in aircraft. It is preferred that plastics as mentioned be used, although obviously other materials may be used in whole or in part. The location of the point X is facilitated by having both the central hub and the vertical straight edge made of transparent materials, although obviously this is not essential.

It is believed that the advantages of the device will be manifest.

I claim as my invention:

1. In plotting boards for navigation, a vertical straight edge, a hub having a central aperture, a slot being formed in the upper surface of the hub, said hub being threaded on the straight edge so that the hub slides vertically on the straight edge disposed in the slot, said hub having a peripheral shoulder, an annular protractor having a central aperture and arranged to seat on said shoulder, a graduated straight edge slidably mounted on said protractor, a declination correcting disc superposed on said shoulder and having a reference line, and a friction element engaging between the hub and the declination correcting disc to restrain relative movements therebetween.

2. In plotting boards, a protractor assembly comprising a hub having a sloping peripheral edge, a graduated protractor having a sloping inner periphery seated and rotatable on the sloping edge, said protractor having a lower slot, a graduated straight edge mounted slidably in said slot and angularly adjustable with the protractor through 360°, and said hub having an upper slot and a straight edge slidable in said last slot.

3. In plotting boards for navigation, an annular protractor, said protractor having a central axial aperture defined in part by a sloping surface convergent toward the upper surface of the protractor, said protractor having a transverse slot in its lower surface, a graduated straight edge being slidably disposed in said slot in substantial contact with said surface of the board, and means supporting the protractor for free rotation to dispose the straight edge at any desired angular position, while providing for bodily vertical movements relative to the board, said means comprising a central hub member having an outer tapered edge arranged to engage the sloping surface to form a bearing for the protractor, a straight edge engaging said hub so as to guide the protractor and hub in their vertical bodily shifting movements.

4. In plotting boards for navigation, a graduated straight edge, a vertical straight edge overlying the graduated straight edge, means mounting the vertical straight edge for bodily lateral shifting while maintaining a predetermined angular relation, and a thin protractor assembly disposed between the two respective straight edges, said protractor assembly comprising a graduated annular protractor disc having a slot in its lower surface within which the graduated straight edge is slidably guided, and a bearing hub having its upper portion interlocking slidably with the vertical straight edge, with the latter overlying the protractor disc to hold it against the bearing surface of the hub.

5. In plotting boards for navigation, a graduated straight edge, a vertical straight edge overlying the graduated straight edge, means mounting the vertical straight edge for bodily lateral shifting while maintaining a predetermined angular relation, and a thin protractor assembly disposed between the two respective straight edges, said protractor assembly comprising a graduated annular protractor disc having a slot in its lower surface within which the graduated straight edge is slidably guided, a bearing hub having its upper portion interlocking slidably with the vertical straight edge, with the latter overlying the protractor disc to hold it against the bearing surface of the hub, and a course disc having a mark to compensate for errors in the compass course overlying said protractor disc and rotatable relative thereto.

6. In plotting boards, a protractor assembly, comprising a hub having a sloping peripheral edge, a graduated protractor having a sloping inner periphery seated and rotatable on the sloping edge, said protractor having a lower slot, a graduated straight edge mounted slidably in said slot and angularly adjustable with the protractor through 360°, said hub having an upper slot, a straight edge slidable in said last slot, and arranged for bodily shifting movement while maintaining a predetermining angularity of the straight edge, an apertured course-correcting transparent disc mounted on said protractor surrounding said hub, and a friction element connecting the hub and the correction disc to restrain relative movements thereof while permitting free rotation of the protractor.

7. In plotting boards, a protractor assembly, comprising a hub having a sloping peripheral edge, a graduated protractor having a sloping inner periphery seated and rotatable on the sloping edge, said protractor having a lower slot, a graduated straight edge mounted slidably in said slot and angularly adjustable with the protractor through 360°, said hub having an upper slot, a straight edge slidable in said last slot, and arranged for bodily shifting movement while maintaining a predetermining angularity of the straight edge, and said hub-mounted straight edge being made of substantially transparent material.

8. In plotting boards, a protractor assembly, comprising a hub having a sloping peripheral edge, a graduated protractor having a sloping inner periphery seated and rotatable on the sloping edge, said protractor having a lower slot, a graduated straight edge mounted slidably in said slot and angularly adjustable with the protractor through 360°, said hub having an upper slot, a straight edge slidable in said last slot, and arranged for bodily shifting movement while maintaining a predetermining angularity of the straight edge, said hub being formed of substantially transparent material and having an axial aperture, and said hub-mounted straight edge being made of substantially transparent material and intersecting said aperture with an edge passing through the axis thereof.

9. In plotting boards, a protractor assembly, comprising a hub having a sloping peripheral edge, a graduated protractor having a sloping inner periphery seated and rotatably on the sloping edge, said protractor having a lower slot, a graduated straight edge mounted slidably in said slot and angularly adjustable with the protractor through 360°, said hub having an upper slot, a straight edge slidable in said last slot, and arranged for bodily shifting movement while maintaining a predetermining angularity of the straight edge, said hub being formed of substantially transparent material and having an axial aperture, and said hub-mounted straight edge being made of substantially transparent material and intersecting said aperture with an edge passing through the axis thereof, said graduated straight edge intersecting the aperture in the hub with one edge passing through the axis of said aperture.

OLIVER J. MOCK.